Figure 1:
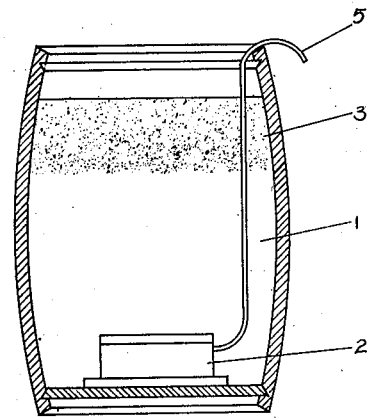

April 9, 1940.   L. A. CHAMBERS ET AL   2,196,193
METHOD OF AGING ALCOHOLIC LIQUORS
Original Filed Nov. 15, 1933

INVENTOR.
LESLIE A. CHAMBERS
EDWARD W. SMITH
BY  ATTORNEY.

Patented Apr. 9, 1940

2,196,193

UNITED STATES PATENT OFFICE 2,196,193

METHOD OF AGING ALCOHOLIC LIQUORS

Leslie A. Chambers, Philadelphia, Pa., and Edward W. Smith, Melrose, Mass., assignors to Submarine Signal Company, Boston, Mass., a corporation of Maine Original application November 15, 1933, Serial No. 698,106. Divided and this application July 29, 1937, Serial No. 156,332

7 Claims. (Cl. 99—48)

The present invention is a division of a copending application Serial No. 698,106, filed November 15, 1933, Patent No. 2,088,585, issued August 3, 1937, and relates to the application of vibratory energy, particularly at supersonic frequencies, to the aging of alcoholic liquors used as beverages, stimulants, etc., for human consumption as, for instance, whiskies, brandies, rums, liqueurs, and to some extent to the so-called lighter or undistilled liquors as wines, cider and champagne and also beer and ale.

The chemical constituents of various liquors are fairly well determined and known as far as the alcohols, acids and esters which predominate in the combination and mixture and the chemical results of aging have also to some degree been established.

In the aging process which has hitherto been employed in the distilled liquors of high alcoholic contents as, for instance, in whiskies and brandies, the raw liquor so-called is put up in oak barrels which may or may not be charred in the interior and is allowed to age in warehouses which preferably are kept at a temperature of about 70° Fahrenheit. The aging may be done for a period of from one to seven years. After a period of four years the aging is practically completed and very little further effect appears to take place.

Three or four noticeable changes occur in the aging process. There is a far greater evaporation of water than alcohol from the barrels, and, therefore, the alcoholic contents increases considerably but this increase is much greater in the first year of aging than later. The acids and esters at first increase but these later come to a point of equilibrium where an increase no longer takes place.

If charred oak barrels are used the color apparently is more easily drawn from the barrel as in the case of aging as practiced in this country, and so also the flavor becomes more pronounced, while if the ordinary oak cask is used uncharred a less pronounced flavor is acquired from the barrel and the liquor lacks the deep coloring that is usual with American whiskies. In the aging also the fusel oil and the furfural are increased beyond the ordinary percentage expected from the concentration of the alcoholic contents alone and contrary to the common belief these constituents as well as the esters furnish the taste or bouquet to the liquor.

Aging apparently cannot take place in a glass or porcelain crock but it further appears that other than certain acids and coloring matter drawn from the wood nothing else is furnished by the wooden cask except possibly some small quantities of aldehydes and other products of wood decomposition. Moreover the cask appears to enter into the aging process something as a catalyst in bringing the acids and esters into close contact to aid the chemical change to take place and bring about an ultimate equilibrium. According to the theory of the applicants, although they may be wrong, an impregnation of the pores of the barrel takes place by osmotic action in which ultimately the alcoholic contents of the liquid is increased. In increasing the alcoholic contents, the liquid absorbs some energy, the action being of an endothermic type and, therefore, the molecular energy of the liquids is increased and the slow chemical reaction of aging takes place.

The barrel, therefore, acts in a manner somewhat similar to a catalyst supplying a localized physical effect which brings about a chemical reaction at a temperature lower than what would ordinarily be possible.

Successful aging has only been practiced by the former standard method which takes a period longer than a year.

Quick aging has been previously attempted but has never proved to be successful. Most of the rapid aging is brought about by the use of heat applied to the liquor to bring about not only the concentration of the liquor, but also the esterification as well as the coloring and flavoring of the liquor but aging by the application of heat definitely drives off some of the volatile esters and alcohols and destroys the fine taste, bouquet and character of the liquors. It is extremely important to bring about the aging of the liquors and the changes that take place in the aging of liquors without the application of heat or the heating of the liquids. According to the present invention this is accomplished in a manner that may be called a molecular energy concentration, that is the energy applied is applied in such a manner that the heating effect if any is localized in the molecular or particle structure and does not heat the entire medium so that no vaporization occurs in the ordinary sense.

In the present process the liquor may be placed in the ordinary oak cask which may be charred on the inside and preferably at the bottom of the cask is placed a compressional wave oscillator for producing a continued source of compressional wave vibration. The oscillator may be of the Fessenden type described in the Patent No. 1,167,366 or of any other suitable type and may emit ultra sonic waves. The oscillator may be operated by electrical means or by compressed air or by hydraulic methods.

The oscillator may be operated continuously for a number of hours but preferably is so arranged that it is operated for shorter intermittent periods depending upon the necessary aging and the particular liquor to be treated. In some cases it may be advisable to apply the vibrations at periods separated by times greater than a day and the process can be usefully combined with the regular aging process to materially shorten the aging period to less than a year.

For rapid aging the liquor mixed with charred oak sawdust or plain may be passed over the oscillator by the use of a machine somewhat as described in the patent of Robert L. Williams, No. 2,138,051, issued November 29, 1938. The liquor after being properly filtered may be stored in oak casks and the process repeated soon or after being stored a number of days.

A further system which may be adopted is to use a cask or crock which may or may not be of wood and to put charred sticks or sawdust in the barrel with the liquids and apply compressional vibrations to the liquor. The sticks or sawdust may be removed after the sound vibrations have been applied and fresh sticks may be inserted. The process may be repeated at intervals is desired. An agitator may also be used to obtain a circulation of the liquor over the diaphragm of the oscillator.

Figure 2:
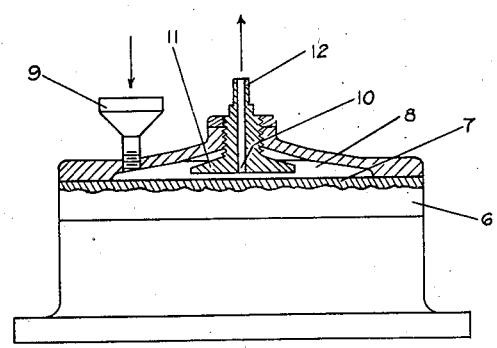

The apparatus which may be used in the method described is shown in Figures 1 and 2.

In Figure 1 the wooden cask is represented in vertical section in which the liquor 1 is placed. Charred sawdust 3 or charred wood may be also put in the barrel. The oscillator 2 may be placed in the bottom of the barrel or in any other convenient position and electrical energy may be supplied from the conductors 5.

A method using the apparatus described in the Williams Patent No. 2,138,051, issued November 29, 1938 may be used. This apparatus is illustrated in Figure 2 in elevation with parts in vertical section. The oscillator 6 having a diaphragm 7 is covered to form a chamber 8 which has an inlet 9 and an outlet 10 at the center of the nozzle 11. The liquor free or mixed with charred or uncharred sawdust is flowed in through the inlet 9 and drawn out from the outlet 10 by means of the pipe 12. During the process the oscillator diaphragm is continuously vibrating and bringing about the aging action.

Having now described our invention, we claim:

1. An improved method for accelerating the artificial aging of raw fermented and distilled alcoholic beverages to effect chemical and physical changes and produce therein characteristics of a time-aged beverage, which comprises subjecting the beverage in the liquid state as a compact mass to the direct action of mechanically produced compressional waves of supersonic frequency.

2. The process of accelerating the artificial aging of fermented and distilled alcoholic liquor, which comprises subjecting the liquor in an oak container and in the presence of air to the chemical reaction accelerating influence of mechanically produced compressional waves having a supersonic frequency.

3. The process of accelerating artificial aging of fermented and distilled alcoholic liquor, which comprises subjecting the liquor in its liquid state as a stationary mass and in the presence of air and an extract supplying agency to the chemical reaction accelerating influence of internally produced compressional waves of supersonic frequency.

4. The process of accelerating the artificial aging of fermented and distilled alcoholic liquor, which comprises subjecting the liquor in liquid form as a mass in the presence of oxygen and an extract supplying agency to the chemical reaction accelerating influence of compressional waves of supersonic frequency.

5. The process of accelerating the artificial aging of fermented and distilled alcoholic liquor, which comprises placing the liquor in an open container with suitable extract supplying materials and setting up compressional waves of supersonic frequency within said liquor, whereby the aging oxidation and esterfication will be accelerated.

6. The method of treating distilled alcoholic liquors to accelerate the natural aging reactions and impart thereto the characteristics of a time-aged product, which comprises placing the liquor in an open container with tannin supplying materials, and subjecting the liquor in the liquid state as a compact mass to the influence of mechanically produced compressional waves of supersonic frequency.

7. The method of artifically aging distilled alcoholic liquors to impart thereto the characteristics of a time-aged product, which comprises placing the liquor in a suitable container in the presence of oxygen and tannin supplying materials, and subjecting the liquor in its liquid state and as a compact mass to a mechanically vibrating device having a supersonic frequency of vibrtion, whereby compressional waves will be set up internally within the liquid mass.

LESLIE A. CHAMBERS.
EDWARD W. SMITH.